Patented May 23, 1939

2,159,935

UNITED STATES PATENT OFFICE 2,159,935

BRAKE LINING

Vernon H. Sanders, St. Marys, Pa., assignor to Stackpole Carbon Company, St. Marys, Pa., a corporation of Pennsylvania No Drawing. Application August 25, 1936, Serial No. 97,786

10 Claims. (Cl. 106—7.5)

This invention relates to brake linings of the type composed of finely divided materials held together by a suitable heat-hardened binder.

The expense of maintaining the brakes of motor vehicles, particularly heavy vehicles, such as buses and trucks, has always been very high, due to the frequent brake adjustments and the frequent renewal of linings due to wear. In order to enable the brakes of such vehicles to exert the necessary retarding force the linings are subjected to very high pressure against the drum surfaces, and, since the work done by the brake is converted into heat, the surfaces of the linings are subjected to high temperatures during operation. A fault quite general in brake linings heretofore used has been the so-called "fading", i. e., a marked decrease in the frictional retarding effect of the brake when the engagement of the linings with the brake drums is prolonged. The continued application of a brake causes the contacting surfaces to become heated and the coefficients of friction of the brake lining to be reduced with the result that the slippage increases. Heating of the brake surfaces also has had a destructive action upon the friction materials heretofore used and causes rapid wearing away of the friction material.

The present invention has for its object to provide a brake lining which will maintain high frictional characteristics throughout the range of temperatures to which the brake is subjected in service and which will maintain its high frictional characteristics even though subjected continuously, for a considerable period of time, to intense heat.

A further object is to provide a brake lining which has a smooth and uniform action throughout the range of temperatures to which the brake material is subjected in service and at all speeds of operation.

A further object is to provide a hard, dense, non-porous, wear-resistant brake lining having uniform frictional characteristics, which has refractory qualities that enable it to withstand high temperatures without deterioration and which is tough enough to withstand the flexure to which it is subjected during operation without cracking or breaking.

The brake lining of the present invention is composed of thoroughly mixed, finely powdered materials and contains a sufficient amount of a hard refractory material having a high cofficient of friction throughout the range of temperatures to which the lining is subjected in service to eliminate "fading", or lowering of frictional resistance due to heating of the braking surfaces, and make the lining highly resistant to wear. The powdered materials are held together in a dense, hard mass by means of a suitable heat-hardened, resinous binder and the lining is made tough by including therein interspersed fibers of a heat-resistant material, such as asbestos.

The present invention is a continuation in part of and a substitute for my co-pending application, Serial No. 706,231 filed January 11, 1933. Brake linings made in accordance with the disclosure of my co-pending application have been found to possess the desired advantages above enumerated to a considerable degree. However, since the filing of the above application a great deal of experimental work has been done with a view to ascertaining the exact proportions of the various ingredients most desirable and the best methods of preparing and compounding the ingredients to produce the brake lining. These experiments have resulted in improved methods of preparing and compounding the ingredients and have shown that, with the new methods of preparing and compounding the ingredients, the preferred percentages of the materials used are somewhat different from those set forth in the earlier application.

The ingredient of my improved lining which is essential for the maintenance of uniform frictional characteristics at high temperatures, and for making the lining highly resistant to heat and wear is a hard refractory material having a high coefficient of friction, such as feldspar, alumina, silica, rutile, iron pyrites, zircon, or a mixture of two or more such materials. Such materials do not decompose at the temperature usually encountered in service and have high frictional characteristics when hot and a fairly high coefficient of friction when cold. The percentage of such hard refractory material in the initial mixture may be from 10 to 50%. Another important ingredient of the composition is a powdered metal, preferably copper or lead, or an alloy of copper or lead. The metal should be present in the initial mixture in percentages of from 10% to 20%. The metal assists in maintaining friction at high temperatures and increases the thermal conductivity of the lining. It has also been found desirable to have in the composition a small amount of carbon in a form possessing lubricating properties such as powdered graphite, carbon black, or lamp black.

The powdered materials are intimately mixed and are held together in a dense, hard mass by means of a heat hardened resinous binder preferably a phenolic resin, which should comprise 15% to 30% of the initial mixture.

A composition consisting simply of powdered material and a resinous binder would be unsatisfactory for a brake lining on account of its brittleness. In order to toughen the lining so that it can withstand the necessary amount of flexure without breaking or cracking, the lining is reinforced by interspersed fibers of suitable heat-resistant material, such as asbestos. The amount of asbestos or other fiber in the mixture should be from 25% to 50%. When the brake lining material is formed by the extrusion process a small percentage of a suitable drying oil is added to the mixture and the mixture is made plastic by the addition of a suitable solvent such as alcohol or acetone.

One example of a brake lining embodying the invention disclosed in the aforesaid co-pending application is as follows:

Approximately 18% of a phenol-formaldehyde resin in the fusible state was dissolved in acetone to which about 50% of finely powdered feldspar, 20% shredded asbestos, 10% copper, and 2% China-wood oil were added. The materials were thoroughly mixed together, placed in an extrusion press and extruded in a die of the desired size. After extrusion the material was cut into proper lengths, then bent to the desired curvature, and cured at a temperature ranging from 550° to 600° F. The China-wood oil is added to the composition simply to facilitate the extruding operation, and has no appreciable effect upon the final product. When the lining material is made in a mold the drying oil may be omitted. The percentages given herein are by weight.

While brake linings made as above described have excellent wearing, heat-resisting, and friction-maintaining characteristics, further experiments have shown that the brake linings contemplated by the invention can be greatly improved by employing ingredients which are all very finely powdered and by effecting a very thorough mixing of the ingredients. It was also found that by employing asbestos fibers which are very short and interspersing these fibers uniformly throughout the material a higher percentage of asbestos may be advantageously used imparting great strength and toughness to the composition without adversely affecting the frictional characteristics at high temperatures or the wear resisting properties of the lining. When the lining contains a relatively large percentage of asbestos fibres and the refractory material and metal are in the form of very fine powder it has been found advantageous to use a smaller percentage of refractory material and a higher percentage of metal powder.

When short fiber asbestos is ground up and very uniformly dispersed throughout the powdered mixture the individual asbestos fibers are well protected against injury by heat and have little effect upon the friction characteristics of the lining. A high percentage of asbestos may be employed by reason of the thorough and uniform dispersion of the fibers throughout the body of the lining. The effect of heat on short uniformly interspersed fibers at the surface of the lining is less injurious to the friction surface, due to destruction of asbestos fibers at the surface, than when relatively long fibers are used. The higher proportion of metal and the addition of a small percentage of graphite or other lubricating carbon, makes the action of the brake smoother throughout the range of temperatures to which the material is subjected and also throughout the range of speeds at which the brake drums revolve.

A somewhat higher percentage of phenolic resin than originally employed has also been found to be advantageous. With the finely powdered materials and short fiber asbestos, the percentage of resinous binder can be increased considerably without danger of the lining being deleteriously affected by heat.

The hard refractory material used is in the form of a very fine powder. A flour of silica or other hard refractory material, ground to a fineness such that 95% of the flour will pass through a 200-mesh screen, has been found to be satisfactory. The preferred metal is lead, and this should be in the form of a powder which will pass through a 100-mesh screen. The phenolic resin employed is a brittle phenolic resin, pulverized to between 100-mesh and 200-mesh.

In making the lining, the silica or other refractory flour, powdered metal, short-fiber asbestos, carbon and resin are weighed and thoroughly mixed in a dry state in a ball mill. The dry mix is then placed in the heavy duty mixer of the bread mixer type and sufficient solvent, such as alcohol or acetone, is added to make the mass plastic. If the material is to be extruded a small quantity of a drying oil, such as linseed oil, is added and the mass is kneaded in the mixer for a sufficient length of time to insure uniformity in the plastic mass.

The amount of solvent employed is just sufficient to impart the desired plasticity to the plastic material. The drying oil, such as linseed oil, is used simply to facilitate the subsequent extruding operation, and is not used when the linings are molded. The amount of linseed oil employed is usually about 5%.

After the plastic mass is thoroughly mixed it is placed in an extrusion press having a die of suitable size and shape. The plastic material is extruded, cut into proper lengths, and bent on suitable forms to give the desired curvature. The linings are then heat-treated for about 4 hours at 200° to 300° F. on the forms and then are given a final heat treatment at from 500° to 600° F. for about 4 hours to effect complete polymerization of the binder.

Instead of extruding the material, it may be made plastic and molded cold into strips or blocks of the desired size, or the powdered material after mixing may be molded under heat and pressure. When the material is molded cold it is subsequently heat treated for a sufficient length of time to polymerize the binder.

For the materials prepared and compounded in the manner above described, the preferred range of ingredients is substantially as follows:

| | Per cent |
|---|---|
| High friction refractory material | 10 to 15 |
| Powdered metal | 15 to 20 |
| Asbestos | 25 to 45 |
| Lubricating carbon | 5 to 8 |
| Powdered phenolic resin | 25 to 30 |

One composition within the preferred range is composed of silica flour 10%, lead 17½%, graphite 5%, asbestos fiber 40%, phenolic resin 27½%.

A second composition is composed of silica flour 10%, lead 17½%, graphite 8%, asbestos 37%, phenolic resin 27½%.

A third composition is as follows: silica flour 10%, lead 15%, carbon black 3%, asbestos 44%, phenolic resin 28%.

By making the brake lining of ingredients which are in a very finely divided form the abrasive action which the hard refractory material exerts on metallic surfaces with which it contacts in operation is minimized. Also, the resulting product has greater density and strength. The frictional action of the lining is modified by both the metal and the carbon, and these ingredients appear to make the frictional characteristics of the lining more uniform throughout the ranges of temperatures and speeds, making the action of the brakes smoother and eliminating grabbing and squealing.

The brake lining of the present invention has good heat-conducting characteristics by reason of its relatively high metal content, lessening the intensity of the heat generated at the drum engaging surface. The brake lining of the present invention is non-absorbent. Water or oil coming in contact with the lining remains upon the surface and will impair the braking action only momentarily.

In a test to determine the absorption characteristics of the brake lining material of the present invention, a brake lining was submerged in water subjected to a vacuum of 28" for a period of twenty-four hours and was found to have an absorption of only 4%.

When in use the brake lining quickly acquires a smooth glossy surface and the brake drum surface becomes very highly polished. The coacting surface, however, presents high frictional resistance to relative movement when engaged.

Furthermore, it is to be understood that the particular form of product shown and described, and the particular procedure set forth, are presented for purposes of explanation and illustration and that various modifications of said product and procedure can be made without departing from my invention as defined in the appended claims.

What I claim is:

1. A hard, tough and wear and heat-resistant brake lining comprising finely powdered hard refractory material which has a high coefficient of friction throughout the range of temperatures to which the lining is subjected in service and fibres of a heat-resistant material interspersed throughout the finely powdered material, the powdered material and interspersed fibres being bound together in a hard, solid mass by a heat-hardened resinous binder.

2. A hard, tough and wear and heat-resistant brake lining comprising a mixture of a finely powdered hard refractory material having a high coefficient of friction and a powdered metal, the powdered material having fibres of a heat-resistant material interspersed therein and the powdered material and fibres being bound together in a hard, solid mass by a heat-hardened resinous binder.

3. A hard, tough and wear and heat-resistant brake lining comprising a mixture of a finely powdered hard refractory material having a high coefficient of friction and a powdered metal, having asbestos fibres interspersed therein, the powdered material and fibres being bound together in a hard, solid mass by a heat-hardened phenolic resin.

4. A hard, tough and wear and heat-resistant brake lining comprising a mixture of a finely powdered hard refractory material having a high coefficient of friction, powdered to approximately 200-mesh and a relatively soft metal, powdered to approximately 100-mesh, the powdered material having asbestos fibres interspersed therein and the powdered material and fibres being bound together in a hard, solid mass by a heat-hardened resinous binder.

5. A hard, tough and wear and heat-resistant brake lining comprising an intimate mixture of finely powdered silica, finely powdered metal and asbestos fibres bound together by a phenolic resin binder.

6. A hard, tough and wear and heat-resistant brake lining comprising an intimate mixture of finely powdered silica, finely powdered metal, a relatively small amount of finely divided lubricating carbon and short asbestos fibres held together by a polymerized resinous binder.

7. A hard, tough and wear and heat-resistant brake lining comprising a mixture of finely powdered materials having short asbestos fibres interspersed therein and bound into a hard, solid mass by a heat-hardened resinous binder, the finely powdered materials comprising a hard refractory material having a high coefficient of friction and a metal, the amount of metal being in excess of the hard refractory material and the amount of asbestos fibre in the lining being sufficient to make the lining sufficiently tough to withstand the flexing to which it is subjected in service without cracking or breaking.

8. A hard, tough and wear and heat-resistant brake lining comprising a mixture of finely powdered silica, finely powdered lead and lubricating carbon having short asbestos fibres interspersed therein, the powdered materials and fibres being bound together in a dense hard mass by a heat hardened phenolic resin.

9. A hard, tough and wear and heat-resistant brake lining formed by mixing, forming and baking a mixture, comprising 10% to 50% of a finely powdered hard refractory material having a high coefficient of friction, 10% to 20% of a finely powdered metal, 25% to 50% of asbestos, and 15% to 30% of a phenolic resin.

10. A hard, tough and wear and heat-resistant brake lining formed by mixing, forming and baking a mixture, comprising fine silica flour 10%, powdered lead 15% to 20%, short fibre asbestos 35% to 45%, lubricating carbon 3% to 10%, and phenolic resin 25% to 30%.

VERNON H. SANDERS.